United States Patent

Isaksson et al.

[11] Patent Number: 6,130,979
[45] Date of Patent: Oct. 10, 2000

[54] OPTO-ELECTRONIC MODULE

[75] Inventors: Jan Isaksson, Taby; Michael Widman, Kungsangen, both of Sweden

[73] Assignee: Mitel Semiconductor AB, Sweden

[21] Appl. No.: 09/114,141

[22] Filed: Jul. 13, 1998

[30] Foreign Application Priority Data

Jul. 14, 1997 [GB] United Kingdom .................... 9714823

[51] Int. Cl.$^7$ ...................................................... G02B 6/36
[52] U.S. Cl. .................. 385/89; 385/88; 385/92
[58] Field of Search ................... 385/88, 89, 90, 385/91, 92, 93, 94

[56] References Cited

U.S. PATENT DOCUMENTS

| 5,005,939 | 4/1991 | Arvanitakis et al. . | |
|---|---|---|---|
| 5,091,991 | 2/1992 | Briggs et al. . | |
| 5,101,465 | 3/1992 | Murphy . | |
| 5,109,453 | 4/1992 | Edwards et al. . | |
| 5,179,609 | 1/1993 | Blonder | 385/89 |
| 5,231,685 | 7/1993 | Hanzawa et al. . | |
| 5,345,527 | 9/1994 | Lebby et al. . | |
| 5,420,954 | 5/1995 | Swirhun | 385/92 |
| 5,499,311 | 3/1996 | DeCusatis . | |
| 5,574,814 | 11/1996 | Noddings | 385/90 |
| 5,611,013 | 3/1997 | Curzio | 385/89 |
| 5,671,315 | 9/1997 | Tabuchi | 385/137 |
| 5,937,125 | 8/1999 | Creswick | 385/88 |

FOREIGN PATENT DOCUMENTS

| 55-129307 | 10/1980 | Japan . |
|---|---|---|
| 4254807 | 9/1992 | Japan . |
| 5-145091 | 6/1993 | Japan . |
| 09015459 A | 1/1997 | Japan . |
| 09090158 A | 4/1997 | Japan . |
| 08288591 A | 11/1997 | Japan . |
| WO 94/28448 | 12/1994 | WIPO . |
| WO 95/34836 | 12/1995 | WIPO . |

Primary Examiner—Cassandra Spyrou
Assistant Examiner—Leo Boutsikaris
Attorney, Agent, or Firm—Laubscher & Laubscher

[57] ABSTRACT

An assembly for use in transferring optical signals from an array of surface-emitting lasers to an array of optical fibers. The laser diodes are mounted on a lead frame type structure in an arrangement which corresponds to the position of optical fibers mounted in an optical fiber ferrule. Complementary alignment means in the lead frame and optical fiber ferrule provides proper positioning of the optical fibers in relation to the laser array when assembled.

12 Claims, 2 Drawing Sheets

OPTO-ELECTRONIC MODULE

FIELD OF THE INVENTION

This invention relates to an opto-electronic module and more particularly to an economical modular structure for the efficient transfer of optical power from a source to an optical transmission medium.

BACKGROUND OF THE INVENTION

Optical sources such as laser diodes are commonly used for communication links over fiberoptic cables. The alignment of the fiberoptic thread-like transmission medium to a laser diode for the efficient transfer of optical power requires accurate positioning and alignment fixtures. The process is even more complex when an array of several sources and optical fibers are involved.

One of the prior art techniques has been to utilize silicon substrates and to etch, utilizing photolithographic alignment techniques, grooves in the substrate in order to accurately locate the optical fibers in relation to edge-emitting laser diodes.

Since testing of edge-emitting laser diodes prior to assembly is unreliable, it is not uncommon for arrays to be assembled only to find that the lasers do not meet wavelength or power output requirements. This results in low assembly yields which in turn increases the module costs.

Recent developments in surface-emitting laser diode technology has meant that more traditional and well-proven processing techniques can be utilized in the fabrication of laser arrays. This has resulted in devices having metalization configurations applicable to flip-chip bonding, thereby eliminating assembly problems associated with wire bonding.

SUMMARY OF THE INVENTION

The present invention utilizes surface-emitting lasers, optical fiber arrays and alignment means to accurately position one in relation to the other.

Therefore, in accordance with a first aspect of the present invention, there is provided an optical module comprising: an optical source; a carrier for the optical source having electrically-conducting pads for providing electrical power to the source, the carrier having first alignment means; and an optical fiber ferrule for supporting an optical fiber, the fiber having second alignment means complementary to the first alignment means whereby the optical fiber and the optical source are aligned when the first and second alignment means are aligned.

In accordance with a preferred embodiment of the present invention, the carrier has a plurality of optical sources such as surface-emitting lasers and the optical fiber ferrule has an array of optical fibers in the same configuration as the optical sources. The alignment means comprises guide pins for mating engagement with appropriately positioned holes in the module components.

In accordance with a second aspect of the present invention there is provided a method of forming an optical source/receiver pair comprising the steps of: placing an optical source on a lead frame such that in a powered condition optical power from the source is directed perpendicularly to the plane of the lead frame, the lead frame being provided with first alignment means orientated in relation to the optical source; positioning an optical fiber in an optical fiber carrier having a front face such that a free end of the optical fiber is substantially even with the front face, the optical fiber carrier having second alignment means which are complementary to the first alignment means; and locating the fiber optic carrier in juxtaposition to the lead frame such that the alignment means are in mating engagement to thereby align the optical fiber to the optical source.

BRIEF DESCRIPTION OF THE DRAWINGS

The invention will now be described in greater detail having reference to the attached drawings wherein.

DETAILED DESCRIPTION OF THE INVENTION

Figure 1:
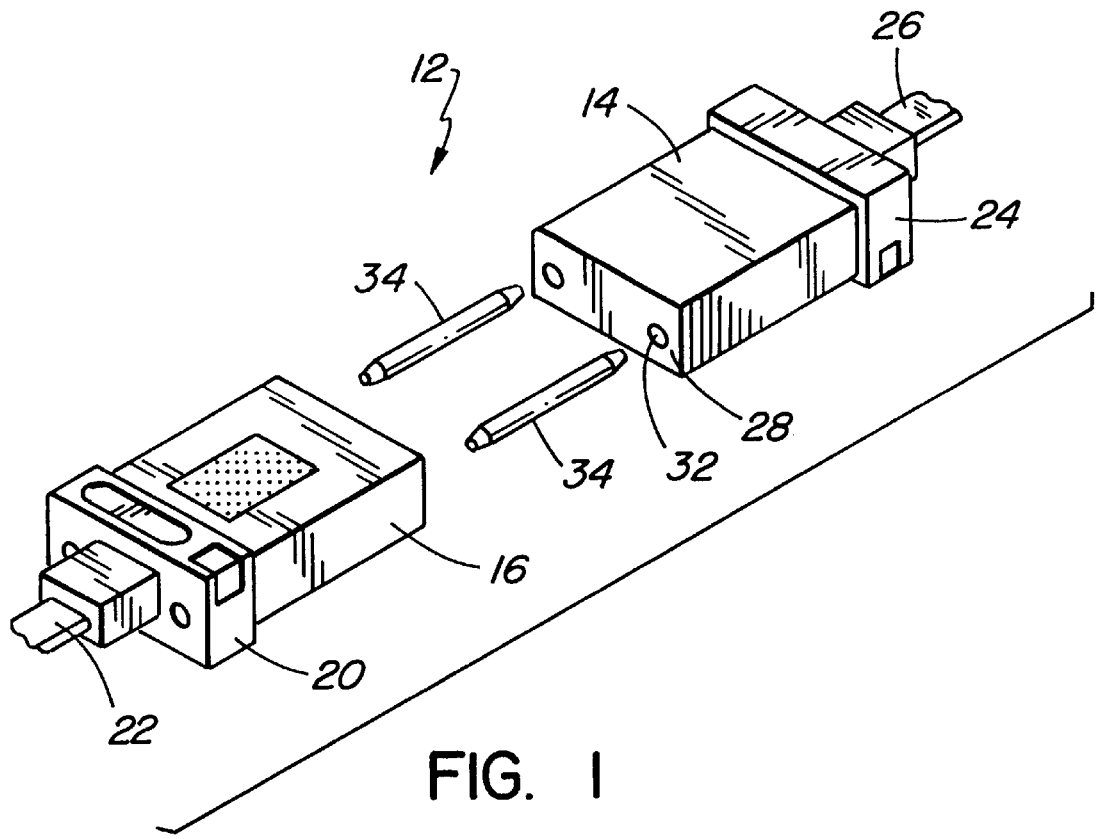
FIG. 1 is a perspective view of the source/detector pair.

As shown in FIG. 1 the module 12 according to the present invention includes fiberoptic ferrule 14 and laser array housing 16. Housing 16 includes cable attachment means 20 for supporting electrical cable 22 which provides electrical power to the laser array as will be discussed hereinafter. Optical fiber ferrule 14 includes cable harness 24 for supporting fiber optic cable 26 which in turn transfers optical signals received on individual optical fibers to downstream receivers such as discreet photo diodes (not shown).

Figure 2:
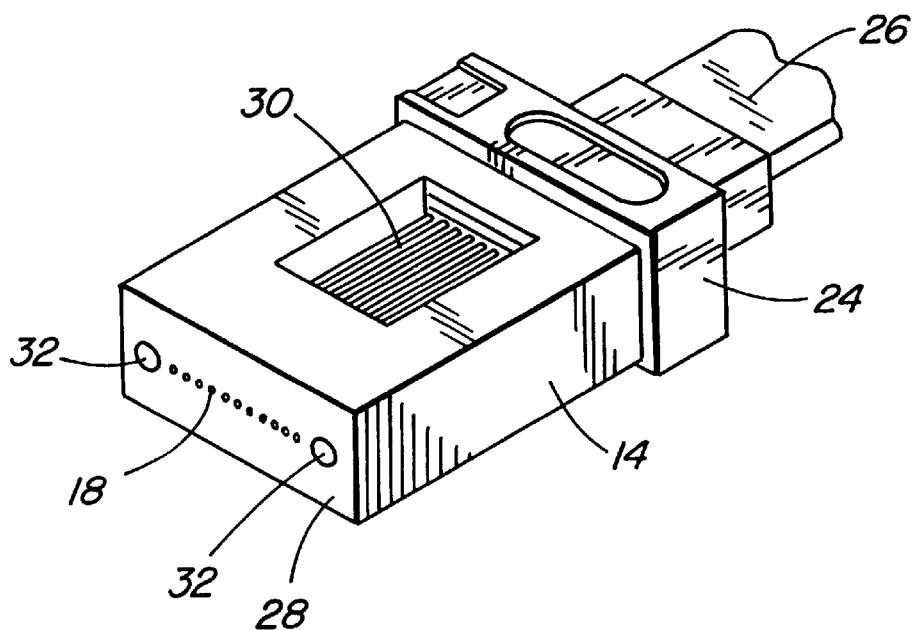
FIG. 2 is an enlarged view of the fiberoptic array.

Front face 28 of ferrule 14 has exposed end faces 18 of individual optical fibers 30 as best seen in FIG. 2. The end face of each fiber is polished as is well-known for receiving an optical signal thereon. End face 28 of ferrule 14 is also provided with alignment holes 32 which, in a preferred embodiment, are configured to receive pins 34. Pins 34 may be either permanently secured in holes 32 or they may be removable as shown in FIG. 1. It is to be understood, however, that pins 34 when inserted in holes 32 are firmly held therein to ensure proper alignment as will be discussed later.

As shown in FIG. 2 optical fibers 30 extend from front face 28 through to the cable 26 for transferring optical signals to appropriate receivers downstream. While FIG. 2 shows an array of optical fibers it is to be understood that the unit may have only one fiber.

Figure 3:
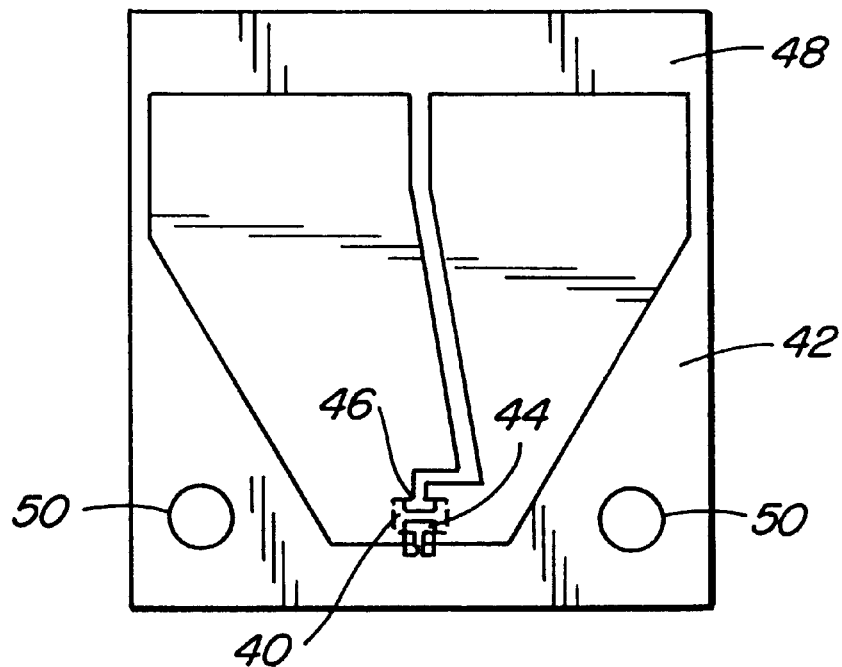
FIG. 3 is a plan view of a lead frame for receiving a single laser diode.

Encased within housing 16 is a substrate (not shown) for connection to cable 22 in order to provide electrical power to the laser diode 40 shown in dotted line in FIG. 3. The carrier or lead frame 42 shown in FIG. 3 is connected to the substrate and to laser diode 40 via contact pads 44 and 46. This configuration permits flip-chip bonding of laser diode to the pads while permitting the surface-emitting laser to provide a collimated beam in a direction away from the plane of the contacts. As is known, the end strip 48 is removed after the laser has been attached and the package otherwise completed in order to isolate the two pads 44 and 46.

Lead frame 42 also has holes 50 which are precisely aligned in relation to the bonding pads 44,46.

Figure 4:
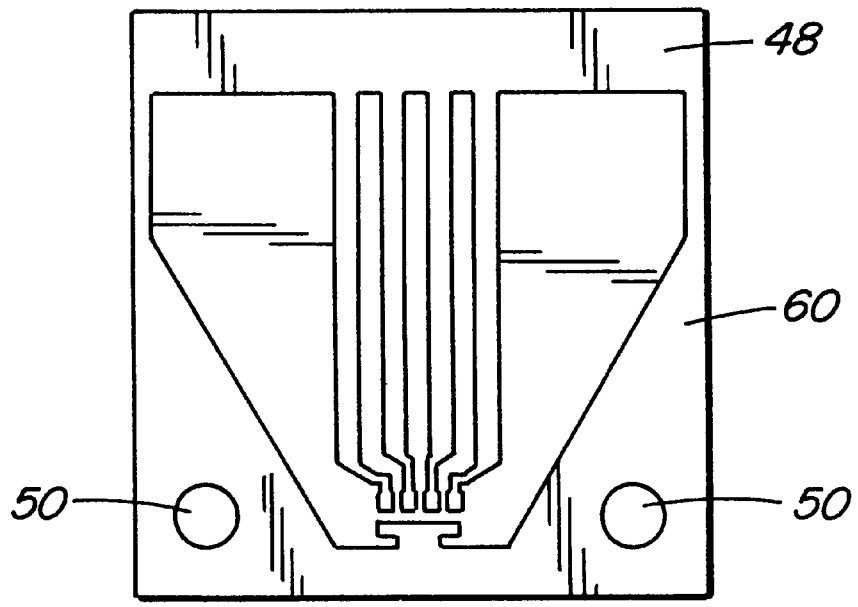
FIG. 4 is a plan view of a lead frame for receiving a laser array.

FIG. 4 illustrates an alternate lead frame structure which is intended to accommodate a four-laser diode array. The lead frame design, also, is such that the flip-chip bonding pads results in the accurate placement of the diode devices on the metal frame.

Lead frame 60 of FIG. 4 is also provided with holes 50 which as in the single laser embodiment of FIG. 3 are accurately positioned with respect to the bonding pad locations. Although the lead frame 60 of FIG. 4 shows four discreet bonding pads it will be apparent to one skilled in the art that this method is well-suited to arrays having many more laser devices. Similarly, optical housing 14 can accommodate a large number of optical fibers spaced apart on the same centers as the optical sources.

As indicated previously, guide pins 34 when positioned in holes 32 in the ferrule and holes 50 in the lead frame accurately position the optical sources in relation to the end faces of the optical fibers.

In assembly, one or more laser diodes is attached to the appropriate lead frame by flip-chip bonding techniques. This permits accurate positioning of the devices with respect to the alignment holes. The lead frame is clipped to remove the shorting strip and contacts are made to the power connections by well-known means. Some form of protections such as encapsulation or protection plate will support the laser diode array and protect the surface-emitting lasers. Because surface-emitting lasers emit a collimated beam no optical elements are required in order to obtain good optical coupling of optical power into the optical fiber.

The optical fiber ferrule having a single fiber or an array of fibers in an arrangement which matches the laser array is then mated with the laser housing such that the guide pins accurately locate one component in relation to the other.

Other securing means to hold the two components in mating engagement may be used if desired.

While particular embodiments of the invention have been disclosed and illustrated, it will be apparent that certain variations can be made to the basic concept. It is intended that such variations will fall within the scope of the present invention as defined by the appended claims.

What is claimed is:

1. An optical module comprising:

an optical source;

a carrier for said optical source having electrically conducting pads for providing electrical power to said source, said carrier including a metal lead frame having first alignment means comprising a pair of alignment holes; and an optical fiber ferrule supporting an optical fiber, said ferrule having second alignment means comprising a pair of alignment pins complementary to said first alignment means and dimensioned to be received in said pair of alignment holes whereby said optical fiber and said optical source are aligned when said first and second alignment means are coupled.

2. An optical module as defined in claim 1 wherein said optical source is a surface-emitting, light-emitting diode.

3. An optical module as defined in claim 1 wherein said optical source is a surface-emitting laser.

4. An optical module as defined in claim 1 wherein said first alignment means in said carrier is a pair of holes and said second alignment means in said ferrule is a pair of holes, there being a pair of guide pins for mating engagement between said holes.

5. An optical module as defined in claim 1 wherein said optical fiber is coupled at a distal end to a photodiode.

6. An optical module as defined in claim 1 wherein a plurality of optical sources are spaced apart on said carrier and said ferrule has a plurality of optical fibers in the same spaced apart arrangement as said optical sources.

7. An optical module as defined in claim 6 wherein said optical sources are surface-emitting lasers.

8. A method of forming an optical source/receiver pair comprising the steps of:

placing an optical source on a lead frame such that in a powered condition optical power from said source is directed perpendicularly to the plane of said lead frame, said lead frame being provided with a first alignment means comprising a pair of alignment holes oriented in relation to said optical source;

positioning an optical fiber in an optical fiber carrier having a front face such that a free end of said optical fiber is substantially even with said front face, said optical fiber carrier having second alignment means comprising a pair of alignment pins which are complementary to said first alignment means; and locating said optical fiber carrier in juxtaposition to said lead frame such that said alignment means are in mating engagement to thereby align said optical fiber to said optical source.

9. A method as defined in claim 8 wherein a plurality of optical sources are fixed in a predetermined arrangement to said lead frame and a plurality of optical fibers are positioned in said optical fiber carrier in the same arrangement as said optical sources whereby each of said optical sources has a mating optical fiber end.

10. A method as defined in claim 8 wherein said optical sources are surface-emitting lasers.

11. A method as defined in claim 10 wherein said surface-emitting lasers are attached to said lead frame by flip-chip bonding.

12. A method as defined in claim 8 wherein a distal end of each of said optical fibers is coupled to a photodiode.

* * * * *